(12) United States Patent
Kim et al.

(10) Patent No.: US 10,611,316 B2
(45) Date of Patent: Apr. 7, 2020

(54) INSTALLATION DEVICE FOR SURVEILLANCE EQUIPMENT

(71) Applicant: SEHWA MOTOR CO., LTD., Hwaseong-si, Gyeonggi-do (KR)

(72) Inventors: Dong Geun Kim, Hwaseong-si (KR); Seong Joo Kang, Hwaseong-si (KR)

(73) Assignee: SEHWA MOTOR CO., LTD., Hwaseong-si, Gyeonggi-do (KR)

( * ) Notice: Subject to any disclaimer, the term of this patent is extended or adjusted under 35 U.S.C. 154(b) by 5 days.

(21) Appl. No.: 16/079,098

(22) PCT Filed: Feb. 23, 2017

(86) PCT No.: PCT/KR2017/001993
§ 371 (c)(1),
(2) Date: Aug. 23, 2018

(87) PCT Pub. No.: WO2017/146481
PCT Pub. Date: Aug. 31, 2017

(65) Prior Publication Data
US 2019/0047487 A1  Feb. 14, 2019

(30) Foreign Application Priority Data
Feb. 26, 2016 (KR) .......................... 10-2016-0023374

(51) Int. Cl.
*B60R 11/04* (2006.01)
*H01Q 1/18* (2006.01)
(Continued)

(52) U.S. Cl.
CPC ............. *B60R 11/04* (2013.01); *F16M 11/20* (2013.01); *G01S 13/86* (2013.01);
(Continued)

(58) Field of Classification Search
None
See application file for complete search history.

(56) References Cited

U.S. PATENT DOCUMENTS 6,991,384 B1 * 1/2006 Davis ................... F16M 11/041
248/187.1
7,658,556 B2 * 2/2010 Johnson ................ F16M 11/02
396/428
(Continued)

FOREIGN PATENT DOCUMENTS

JP           2003-002137 A    1/2003
KR    10-2005-0037901 A    4/2005
(Continued)

OTHER PUBLICATIONS

International Search Report in International Application No. PCT/KR2017/001993 dated May 29, 2017.

*Primary Examiner* — Twyler L Haskins
*Assistant Examiner* — Wesley J Chiu
(74) *Attorney, Agent, or Firm* — Park, Kim & Suh, LLC (57) ABSTRACT

The present invention relates to a surveillance equipment mounting unit that enables easy attachment and detachment of various surveillance equipment to/from a top end of a pillar installed on a vehicle and includes: a plate on which a bottom surface of the surveillance equipment is seated; and a reverse rotation prevention part coupled to connect a lower portion of the plate and the top end of the pillar to each other and allowing the plate to be rotated in only one direction. According to the present invention, the following advantages are provided: equipment mounted on a vehicle, such as a thermal observation device, radar, etc., can be easily coupled to the mounting unit regardless of type; a rotation angle can be controlled; a reverse rotation can be prevented;

(Continued)

and mounting performance can be significantly improved by allowing release through releasing a reverse rotation prevention function.

4 Claims, 6 Drawing Sheets

(51) Int. Cl.

| | | |
|---|---|---|
| *H01Q 1/32* | (2006.01) | |
| *H01Q 1/12* | (2006.01) | |
| *F16M 11/20* | (2006.01) | |
| *G01S 13/86* | (2006.01) | |
| *G08B 13/196* | (2006.01) | |
| *H04N 7/18* | (2006.01) | |
| *G01S 13/02* | (2006.01) | |
| *G01S 7/02* | (2006.01) | |
| *B60R 11/00* | (2006.01) | |

(52) U.S. Cl.
CPC ..... *G08B 13/19602* (2013.01); *H01Q 1/1228* (2013.01); *H01Q 1/18* (2013.01); *H01Q 1/3233* (2013.01); *H01Q 1/3291* (2013.01); *H04N 7/185* (2013.01); *B60R 2011/0003* (2013.01); *G01S 13/0218* (2013.01); *G01S 2007/027* (2013.01)

(56) References Cited

U.S. PATENT DOCUMENTS

| | | | | |
|---|---|---|---|---|
| 8,137,008 | B1* | 3/2012 | Mallano | B60R 11/04 396/427 |
| 2004/0223078 | A1* | 11/2004 | Zadok | F16M 13/04 348/375 |
| 2008/0099521 | A1* | 5/2008 | Huang | B60R 11/04 224/483 |
| 2008/0116340 | A1* | 5/2008 | Greene | F16M 11/105 248/229.15 |
| 2011/0129210 | A1* | 6/2011 | McGucken | F16M 13/02 396/422 |
| 2019/0047484 | A1* | 2/2019 | Kim | G01S 13/86 |

FOREIGN PATENT DOCUMENTS

| | | |
|---|---|---|
| KR | 10-2006-0098609 A | 9/2006 |
| KR | 10-2012-0008349 A | 1/2012 |
| KR | 10-1305445 B1 | 9/2013 |
| KR | 10-2015-0118720 A | 10/2015 |

* cited by examiner

INSTALLATION DEVICE FOR SURVEILLANCE EQUIPMENT

CROSS-REFERENCE TO RELATED APPLICATIONS

This application is the National Stage filing under 35 U.S.C. 371 of International Application No. PCT/KR2017/001993, filed on Feb. 23, 2017, which claims the benefit of Korean Patent Application No. 10-2016-0023374, filed on Feb. 26, 2016, the contents of which are all hereby incorporated by reference herein in their entirety.

TECHNICAL FIELD

The present invention relates to a surveillance equipment mounting unit. More particularly, the present invention relates to a surveillance equipment mounting unit that enables easy attachment and detachment of various surveillance equipment to/from the mounting unit, the surveillance equipment being mounted on a vehicle and providing remote surveillance during daytime and nighttime.

BACKGROUND ART

Among vehicle-mounted surveillance equipment, a thermal observation device (TOD) is a device that detects infrared rays of an object and converts the same into a video image. It is mainly used for identification of location and dynamics of moving persons and targets during night, and for detection of hidden places.

Furthermore, among the vehicle-mounted surveillance equipment, long-range ground surveillance radar is used to detect moving persons and vehicles within a range of 20 km.

The surveillance equipment is mounted in a vehicle for carrying out surveillance and reconnaissance work at a desired place.

The carrying out of surveillance work using surveillance equipment that is mounted in a fixed location poses a danger of revealing a position to enemies, and thus the location must be kept hidden upon an infiltration operation. However, the carrying out of surveillance work using mobile surveillance equipment enables movement to a desired place and thus reduces exposure to enemies. Thus, a wide surveillance range effect is achieved by using a single equipment, leading to potentially valuable use in many other applications.

It is noted that as a technique of mounting surveillance equipment in a vehicle, a gun cradle is disclosed in Korean Patent Application No. 10-2011-0067418.

The gun cradle is comprised of a vertically installed cradle pillar and a gun support device, and is related to a configuration in which a machine gun is mounted to be pivotable.

Meanwhile, surveillance equipment includes a thermal device or radar for reconnaissance work during daytime and nighttime and may be used as a stationary type or as a mobile type mounted in a vehicle.

The surveillance equipment is coupled to an upper seat surface of a mount. However, a coupling portion structure varies depending on the type of surveillance equipment, and thus it is difficult for a single mount to be compatible with various types of surveillance equipment.

DISCLOSURE

Technical Problem

Accordingly, the present invention has been made keeping in mind the above problem occurring in the related art, and an objective of the present invention is to provide a surveillance equipment mounting unit, wherein equipment mounted on a vehicle, such as a thermal observation device, radar, etc., is easily coupled to the mounting unit regardless of type, a rotation angle is controlled, a reverse rotation is prevented, and mounting performance is significantly improved by allowing release through releasing a reverse rotation prevention function.

Technical Solution

According to an embodiment of the present invention, there is provided a surveillance equipment mounting unit that enables easy attachment and detachment of various surveillance equipment to/from a top end of a pillar installed on a vehicle and includes: a plate on which a bottom surface of the surveillance equipment is seated; and a reverse rotation prevention part coupled to connect a lower portion of the plate and the top end of the pillar to each other and allowing the plate to be rotated in only one direction.

According to the embodiment of the present invention, the reverse rotation prevention part may include: a shaft coupled to a lower center of the plate; a housing to which the shaft is coupled; a ratchet gear inserted into the housing and coupled to the shaft; a stopper engaged with teeth of the ratchet gear; and an operation member controlling operation of rotating the stopper to be locked with or released from the teeth.

According to the embodiment of the present invention, the operation member may include: a rod inserted into a connecting portion coupled to a side of the housing and having a first end hinged to an end of the stopper; a spring coupled to an outside of the rod and allowing the rod to be elastically moved forward and then be moved backward to an original state; and a button provided at a second end of the rod.

According to the embodiment of the present invention, the plate may have multiple mounting recesses formed thereon and includes an adapter coupled to the mounting recesses in an attachable and detachable manner and having a shape corresponding to a coupling portion formed on the bottom surface of the surveillance equipment.

Advantageous Effects

According to the present invention, equipment mounted on a vehicle, such as a thermal observation device, radar, etc., can be easily coupled to the mounting unit regardless of equipment type, the rotation angle can be controlled, the reverse rotation can be prevented, and mounting performance can be significantly improved by allowing release through releasing the reverse rotation prevention function.

BEST MODE

Mode for Invention

Hereinbelow, exemplary embodiments of the present invention will be described in detail with reference to the accompanying drawings. Throughout the drawings, the same reference numerals will refer to the same or like parts. Further, it is to be noted that, when the functions of conventional elements and the detailed description of elements related with the present invention may make the gist of the present invention unclear, a detailed description of those elements will be omitted.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
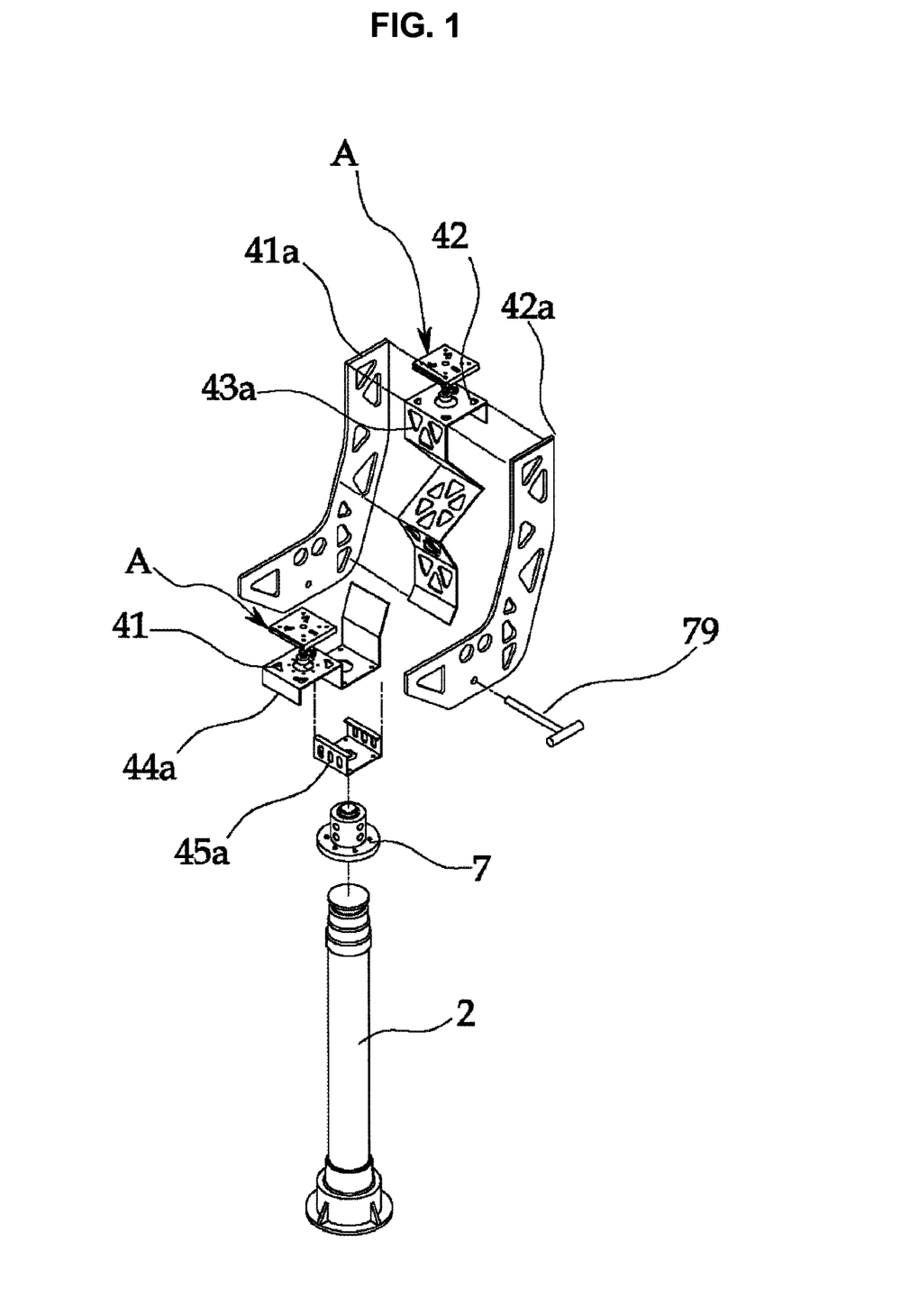
FIG. 1 is an exploded perspective view showing a surveillance equipment mounting device for a vehicle to which the present invention is applied.
Figure 2:
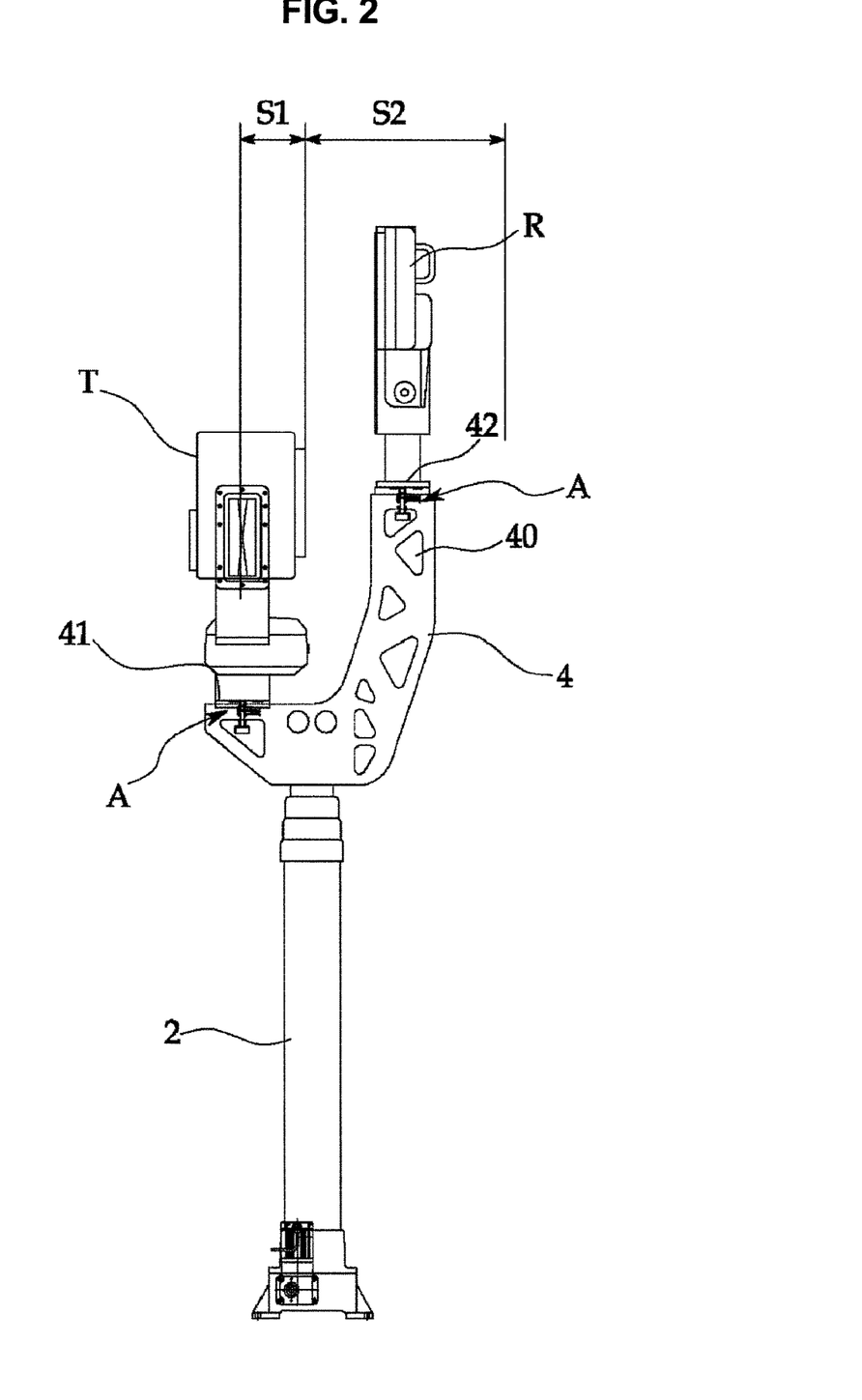
FIG. 2 is a front view showing a use state of a surveillance equipment mounting unit according to the present invention.
Figure 3:
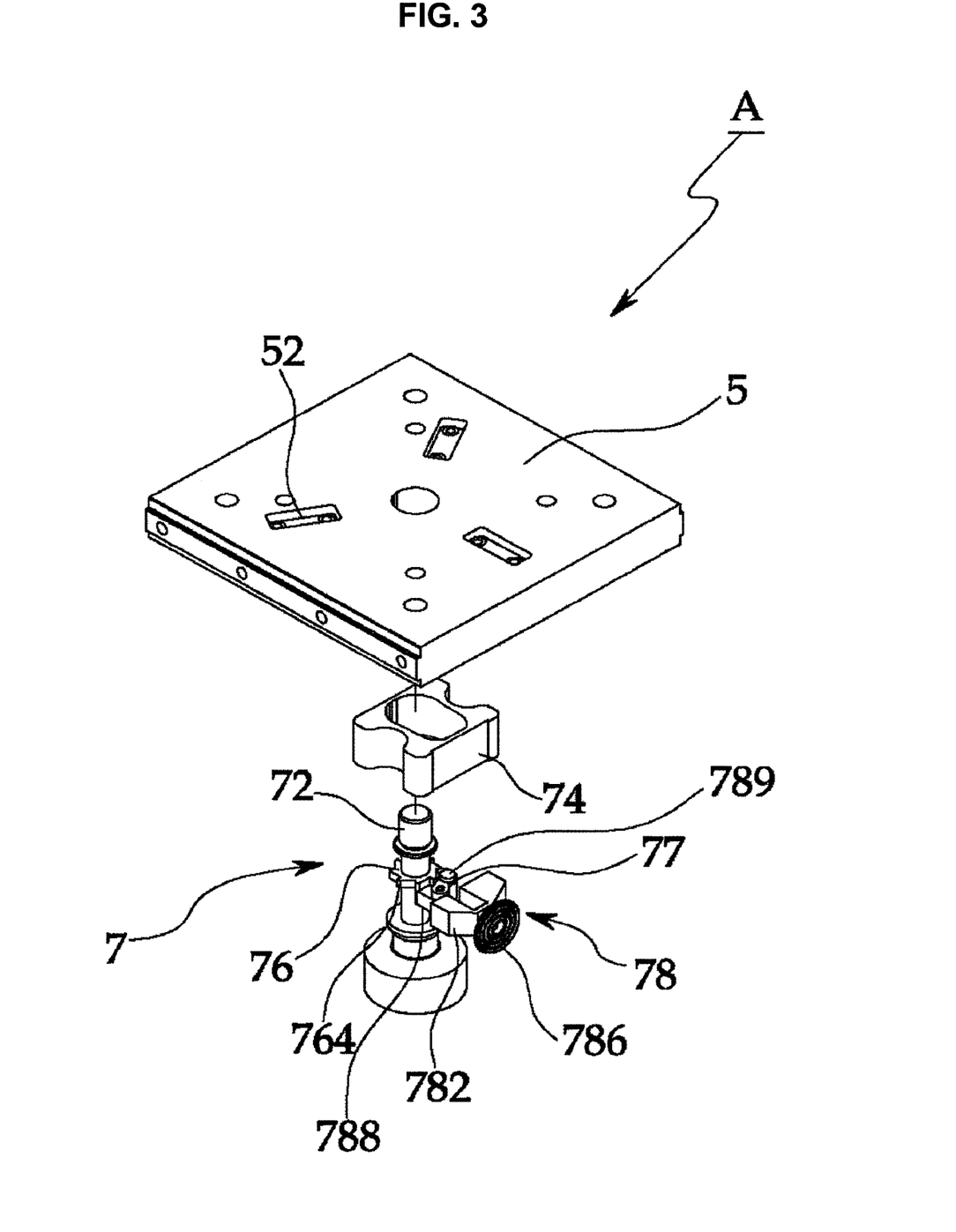
FIG. 3 is an exploded perspective view showing the surveillance equipment mounting unit according to an embodiment of the present invention.
Figure 4:
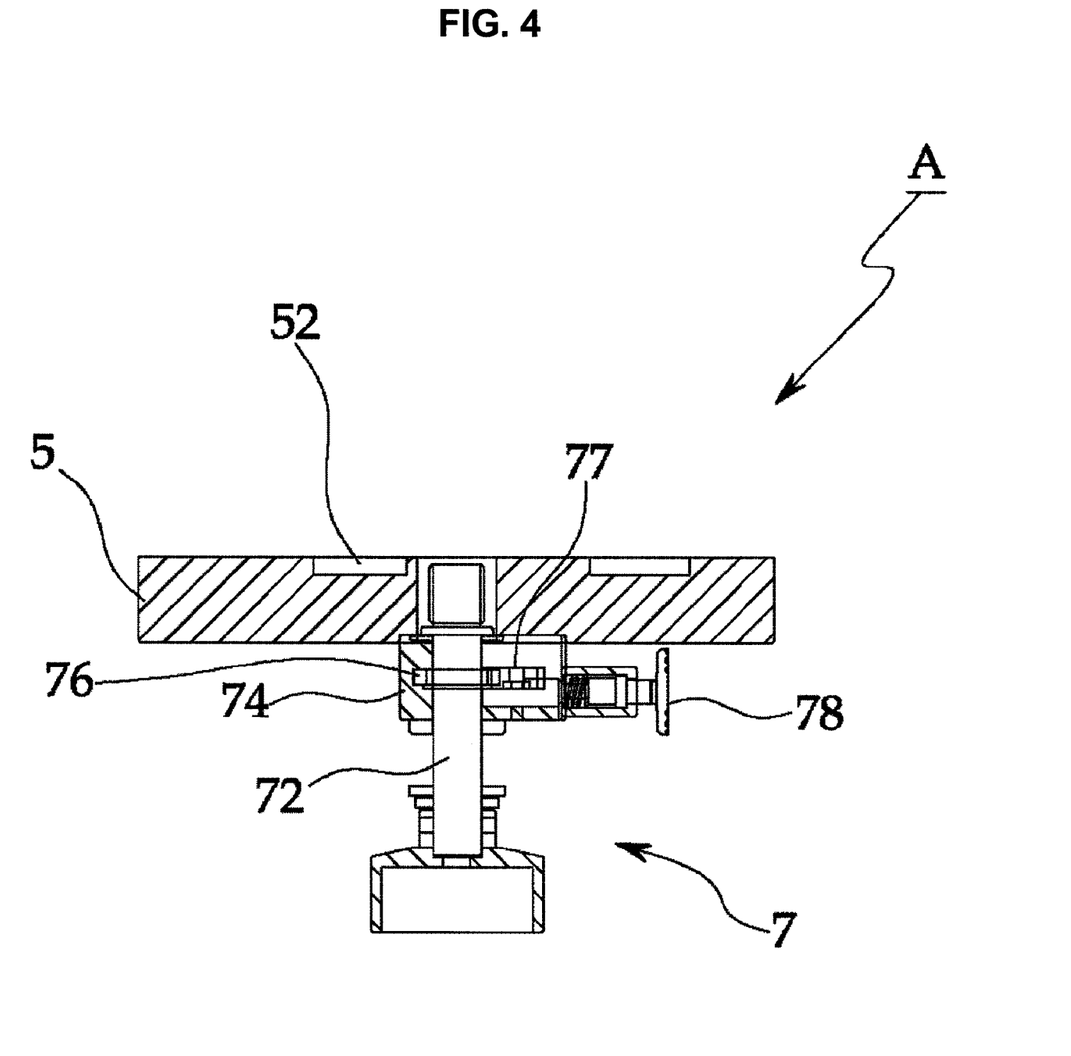
FIG. 4 is an assembled sectional view showing the surveillance equipment mounting unit according to the embodiment of the present invention.
Figure 5:
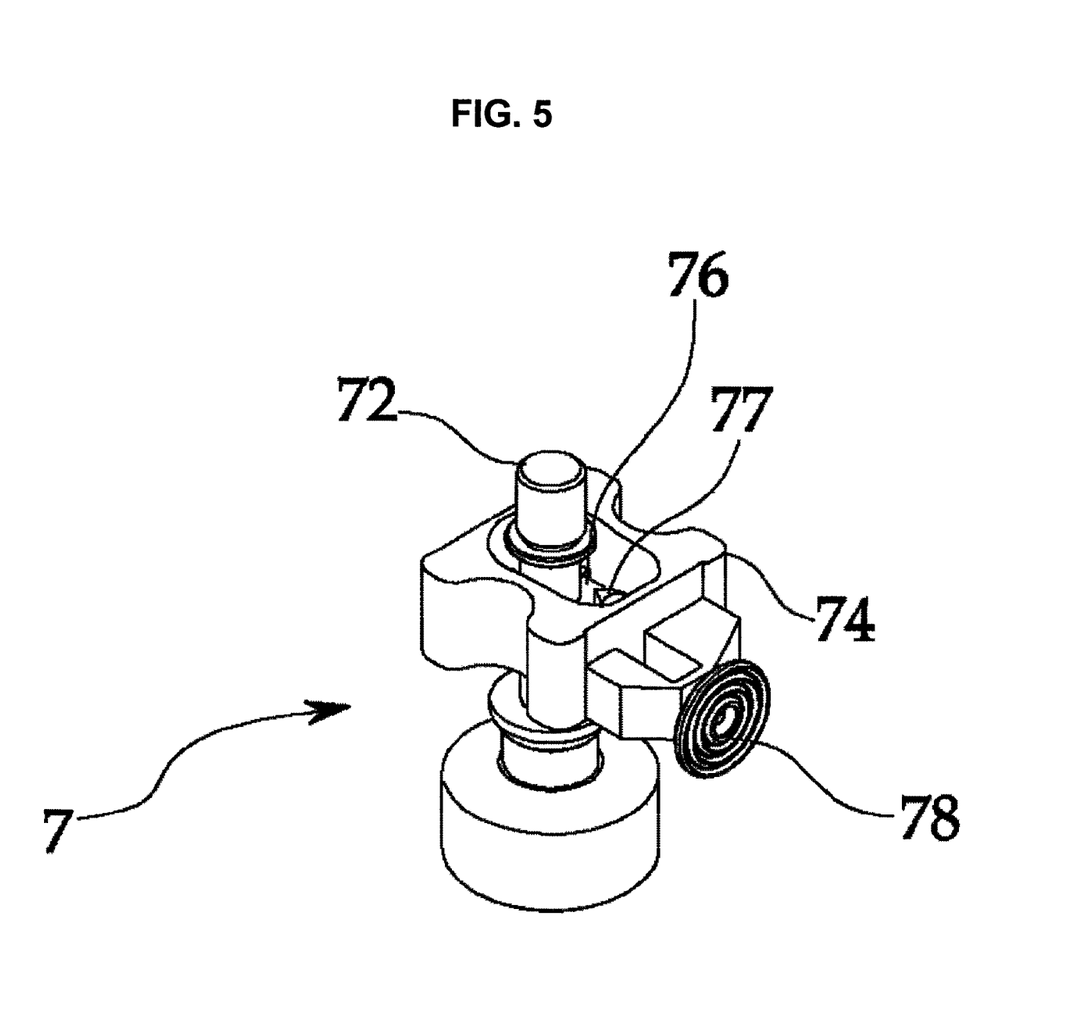
FIG. 5 is an enlarged perspective view showing a reverse rotation prevention part in the surveillance equipment mounting unit according to the embodiment of the present invention.
Figure 6:
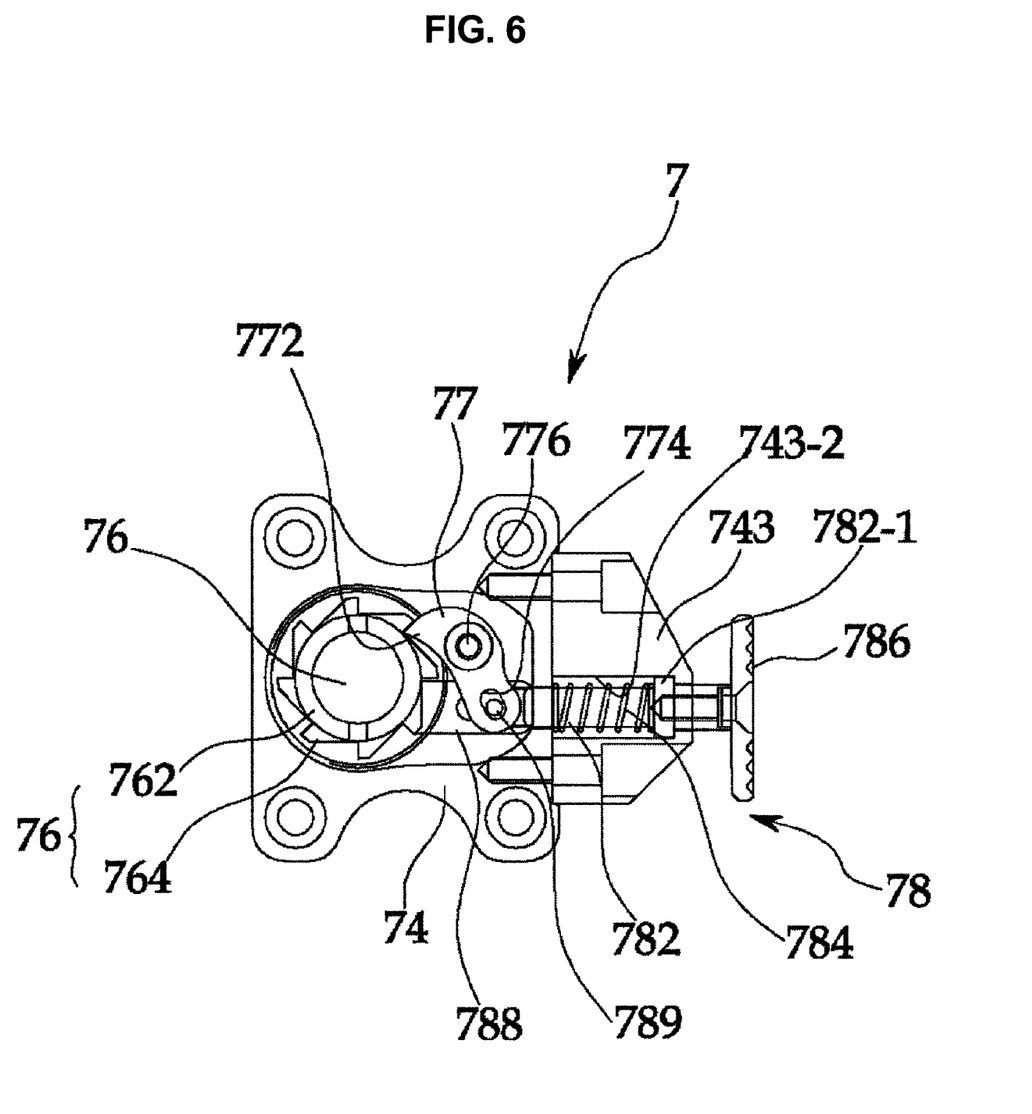
FIG. 6 is a plan view showing the reverse rotation prevention part in the surveillance equipment mounting unit according to the embodiment of the present invention.

In the accompanying drawings, FIG. 1 is an exploded perspective view showing a surveillance equipment mounting device for a vehicle to which the present invention is applied, FIG. 2 is a front view showing a use state of a surveillance equipment mounting unit according to the present invention, FIG. 3 is an exploded perspective view showing the surveillance equipment mounting unit according to an embodiment of the present invention, FIG. 4 is an assembled sectional view showing the surveillance equipment mounting unit according to the embodiment of the present invention, FIG. 5 is an enlarged perspective view showing a reverse rotation prevention part 7 in the surveillance equipment mounting unit according to the embodiment of the present invention, and FIG. 6 is a plan view showing the reverse rotation prevention part in the surveillance equipment mounting unit according to the embodiment of the present invention.

The surveillance equipment mounting device for the vehicle to which the present invention is applied is configured to enable easy attachment and detachment of various surveillance equipment to/from an upper end of a pillar installed on a vehicle. The pillar 2 is vertically provided on a floor of the vehicle and a substantially arc-shaped support member 4 is mounted on the top end of the pillar 2.

The pillar 2 is configured with multiple pillar rods fitted to each other in a telescopic manner such that a lower end thereof is fixedly mounted on the floor of a vehicle, that is, on the floor of a rear seat or on the floor of a loading box while the pillar extends in length upward. The support member 4 has surveillance equipment T and R respectively mounted on opposite ends thereof. The support member 4 is mounted on the top end of the pillar 2 such that opposite sides of the ' ⌐ ' shape differ from each other in length. The support member 4 is configured such that a first side section S1 is shorter than a second side section S2 with respect to the top end of the pillar 2. The first side section S1 has an end provided with a first mounting part 41 on which the equipment is mounted, and the second side section S2 has an end provided with a second mounting part 42 on which the equipment is mounted, the first mounting part 41 being provided at a position lower than the second mounting part 42.

Accordingly, the surveillance equipment T that is mounted on the first mounting part 41 provided on the short first side section has a higher load than the surveillance equipment R mounted on the second mounting part 42. Herein, the surveillance equipment T is a thermal observation device and the surveillance equipment R is radar.

Furthermore, the support member 4 includes: a ' ⌐ '-shaped first plate 41a; a second plate 42a having the same shape as the first plate 41a and distanced therefrom at a predetermined interval; a first reinforcing portion 43a mounted between the first and second plates 41a and 42a and having a top end provided with a first mounting part 41, the first reinforcing portion being formed of multiple bent plates; a second reinforcing portion 44a mounted between the first and second plates 41a and 42a and having a side provided with a second mounting part 42; and a rotary mounting portion 45a coupled to the second reinforcing portion 44a and to which a rotary member 7 is coupled.

The first and second reinforcing portions 43a and 44a are provided to define a truss structure, leading to an increase in a reinforcing force.

The rotary mounting portion 45a has a through hole centrally formed therein such that the rotary member 7 is coupled thereto. Accordingly, it is possible to rotate the support member 4 by 360 degrees.

The rotary member 7 includes: a rotary shaft base rotatably coupled to an upper inside of the pillar 2; an inner rotary shaft provided vertically and coupled to an upper portion of the rotary shaft base; and an outer rotary shaft coupled to an outside of the inner rotary shaft and supported by the rotary mounting portion.

Each of the inner rotary shaft and the outer rotary shaft is configured such that an outer surface thereof has upper and lower portions each provided with multiple first holes. The first holes and the second holes are formed at the same height and are formed to have the same diameter. Accordingly, the outer rotary shaft is rotated such that the second holes thereof and the first holes of the inner rotary shaft correspond to each other and then a pin is inserted for securement, thereby enabling angle control.

On the other hand, each of the first mounting part 41 and the second mounting part 42 is provided with a mounting unit A for mounting the surveillance equipment T and R.

As shown in FIGS. 3 to 6, the mounting unit A according to an embodiment of the present invention includes a plate 5 on which a bottom surface of each of the surveillance equipment T and R is seated, and a reverse rotation prevention part 7 coupled to connect a lower portion of the plate 5 and the top end of the pillar 2 to each other and allowing the plate 5 to be rotated in only one direction.

Meanwhile, the plate 5 has a planar shape and may vary in shape such as a circle, a square, etc, the plate having an upper surface provided with multiple mounting recesses 52 formed thereon.

An adapter (not shown) is coupled to the multiple mounting recesses 52 in an attachable and detachable manner.

The adapter has a shape corresponding to a coupling portion formed on the bottom surface of the surveillance equipment.

Accordingly, it is possible to attach and detach various surveillance equipment T and R to and from the plate 5 through replacement of the adapter, leading to an improvement of versatility.

The reverse rotation prevention part 7 includes a shaft 72 coupled to a lower center of the plate 5, a housing 74 to which the shaft 72 is coupled, a ratchet gear 76 inserted into the housing 74 and coupled to the shaft 72, a stopper 77 engaged with teeth 764 of the ratchet gear 76, and an operation member 78 controlling operation of rotating the stopper 77 to be locked with or released from the teeth 764.

The ratchet gear 76 is configured with a circular body 762 and multiple teeth 764 circumferentially formed on an outer circumferential surface of the body 762 at regular intervals. The multiple teeth 764 are rotated in one direction and each tooth 764 has an isosceles triangle shape such that the teeth are caught by the stopper 77 to be locked against rotation in the opposite direction. Accordingly, the stopper 77 is normally in tight contact with the body 762 of the ratchet gear 76, and when a tip end 772 thereof comes into contact with a sloped edge of the body 762 of the ratchet gear 76, arrests rotation of the ratchet gear 76. However, when the tip end 772 of the stopper 77 comes into contact with a vertical edge of the body 762 of the ratchet gear 76, the stopper stops rotation of the ratchet gear 76. The ratchet gear 76 is allowed to rotate in only one direction and rotation of the ratchet gear 76 is stopped when rotating in the opposite direction.

The stopper 77 is formed in a substantially elliptical shape and is provided at a first side thereof with the tip end 772 protruding sharply and at a second side thereof with an elongated hole 774 formed therein. It is preferable that a hinge pin 776 serving as a rotation point is coupled to the stopper 77 at a point ½ relative to a longitudinal direction thereof.

The operation member 78 includes a rod 782 inserted into a connecting portion 743 coupled to a side of the housing 74 and having a first end hinged to an end of the stopper 77, a spring 784 coupled to an outside of the rod 782 and allowing the rod 782 to be elastically moved forward and then be moved backward to an original state thereof, and a button 786 provided at a second end of the rod 782.

The connection portion 743 is bolted to the side of the housing 74 and has a passage 743-2 defined therein such that the rod 782 is inserted thereinto.

The rod 782 has an annular step 782-1 formed at a side of an outer periphery thereof such that a first end of the spring 784 is supported thereon, while a second of the spring 784 is supported on an outer surface of the housing 74.

The rod 782 is coupled at the first end with a connector 788, while a pin 789 is coupled to the connector 788 and the pin 789 is coupled to the elongated hole 774 of the stopper 77.

Accordingly, when the rod 782 is moved forward and backward, the pin 789 is moved in the elongated hole 774 to push or pull the end of the stopper 77 so that the stopper 77 is caused to rotate about the hinge pin 789.

In this way, rotation of the stopper 77 causes the tip end 772 thereof to be caught by or released from the ratchet gear 76.

Since the spring 784 is coupled to the outside of the rod 782, when the button 786 is pressed, the spring 784 is compressed and the connector 788 is moved forward to cause the stopper 77 to rotate, resulting in the tip end 772 being distanced from the ratchet gear 76 to be released.

When a force exerted to push the button 786 is released, the stopper 77 is rotated in the opposite direction due to a restoring force of the spring 784 exerting thereon and thus catches the ratchet gear 76 to be in a locking state.

The operation of the present invention configured as described above will now be described.

A suitable adapter (not shown) is attached to the mounting recesses 52 formed on the upper surface of the plate 5.

Then, the surveillance equipment T and R is coupled to the adapter to be secured.

Then, when the surveillance equipment T and R is rotated in one direction, for example, is rotated in a direction in which the ratchet gear 76 is rotated, resulting in the surveillance equipment T and R being rotated by a desired angle.

On the other hand, when the surveillance equipment T and R is rotated in the opposite direction, the surveillance equipment T and R is prevented from being rotated unintentionally in the opposite direction by a catching action of the stopper 77.

Meanwhile, when the button 786 is pressed to release a catching state of the stopper 77, the surveillance equipment T and R is allowed to rotate in the opposite direction and released.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is used to mount surveillance equipment such as a thermal observation device, radar, etc. on a vehicle.

The invention claimed is:

1. A surveillance equipment mounting unit that is configured to mount surveillance equipment on a vehicle in an attachable and detachable manner and comprises:
   a pillar vertically provided on a floor of the vehicle; and
   a support member horizontally provided on a top end of the pillar and having a ˙⌐˙ shape,
   wherein the support member has multiple mounting parts provided at opposite sides thereof, respectively, and
   each of the multiple mounting parts includes:
      a plate on which a bottom surface of the surveillance equipment is seated; and
      a reverse rotation prevention part coupled to connect a lower portion of the plate and the top end of the pillar to each other and allowing the plate to be rotated in only one direction,
   wherein the support member includes:
      a ˙⌐˙-shaped first plate;
      a second plate having the same shape as the first plate and distanced therefrom at a predetermined interval;
      a first reinforcing portion mounted between the first and second plates and having a top end provided with a first mounting part, the first reinforcing portion being formed of multiple bent plates;
      a second reinforcing portion mounted between the first and second plates and having a side provided with a second mounting part; and
      a rotary mounting portion coupled to the second reinforcing portion and to which a rotary member is coupled.

2. The mounting unit of claim 1, wherein the reverse rotation prevention part includes:
   a shaft coupled to a lower center of the plate;
   a housing to which the shaft is coupled;

a ratchet gear inserted into the housing and coupled to the shaft;

a stopper engaged with teeth of the ratchet gear; and an operation member controlling operation of rotating the stopper to be locked with or released from the teeth.

3. The mounting unit of claim 2, wherein the operation member includes:

a rod inserted into a connecting portion coupled to a side of the housing and having a first end hinged to an end of the stopper;

a spring coupled to an outside of the rod and allowing the rod to be elastically moved forward and then be moved backward to an original state; and a button provided at a second end of the rod.

4. A surveillance equipment mounting unit that is configured to mount surveillance equipment on a vehicle in an attachable and detachable manner and comprises:

a pillar vertically provided on a floor of the vehicle; and a support member horizontally provided on a top end of the pillar and having a  shape, wherein the support member has multiple mounting parts provided at opposite sides thereof, respectively, and each of the multiple mounting parts includes:

a plate on which a bottom surface of the surveillance equipment is seated; and a reverse rotation prevention part coupled to connect a lower portion of the plate and the top end of the pillar to each other and allowing the plate to be rotated in only one direction, wherein the reverse rotation prevention part includes:

a shaft coupled to a lower center of the plate;

a housing to which the shaft is coupled;

a ratchet gear inserted into the housing and coupled to the shaft;

a stopper engaged with teeth of the ratchet gear; and an operation member controlling operation of rotating the stopper to be locked with or released from the teeth, wherein the operation member includes:

a rod inserted into a connecting portion coupled to a side of the housing and having a first end hinged to an end of the stopper;

a spring coupled to an outside of the rod and allowing the rod to be elastically moved forward and then be moved backward to an original state; and a button provided at a second end of the rod.

* * * * *